July 31, 1945.    S. SCHNELL    2,380,796
CENTRALIZING DEVICE FOR BRAKE SHOES
Filed March 16, 1944    2 Sheets-Sheet 1
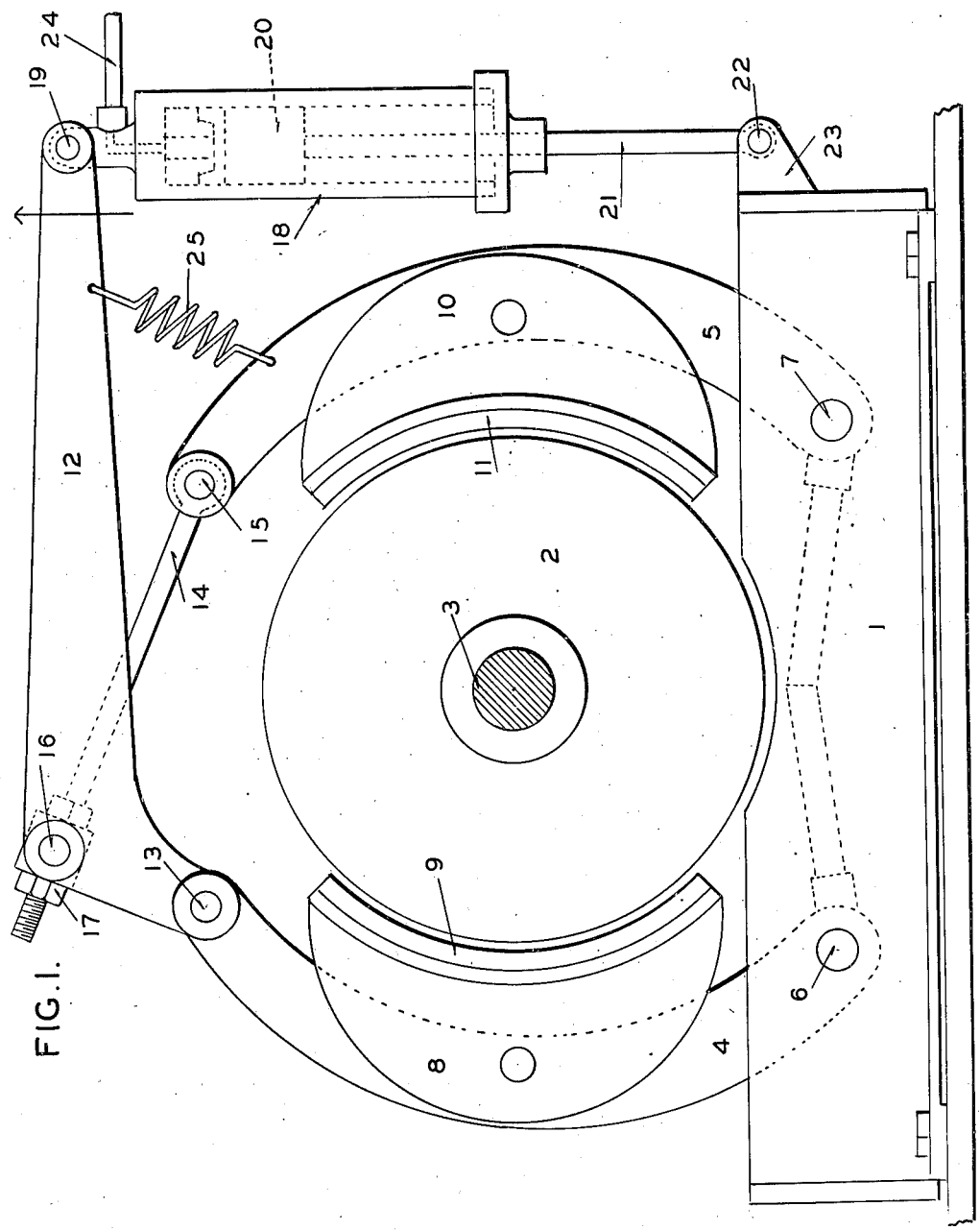
INVENTOR
S. SCHNELL
BY
ATTORNEY July 31, 1945.  S. SCHNELL  2,380,796
CENTRALIZING DEVICE FOR BRAKE SHOES
Filed March 16, 1944  2 Sheets-Sheet 2
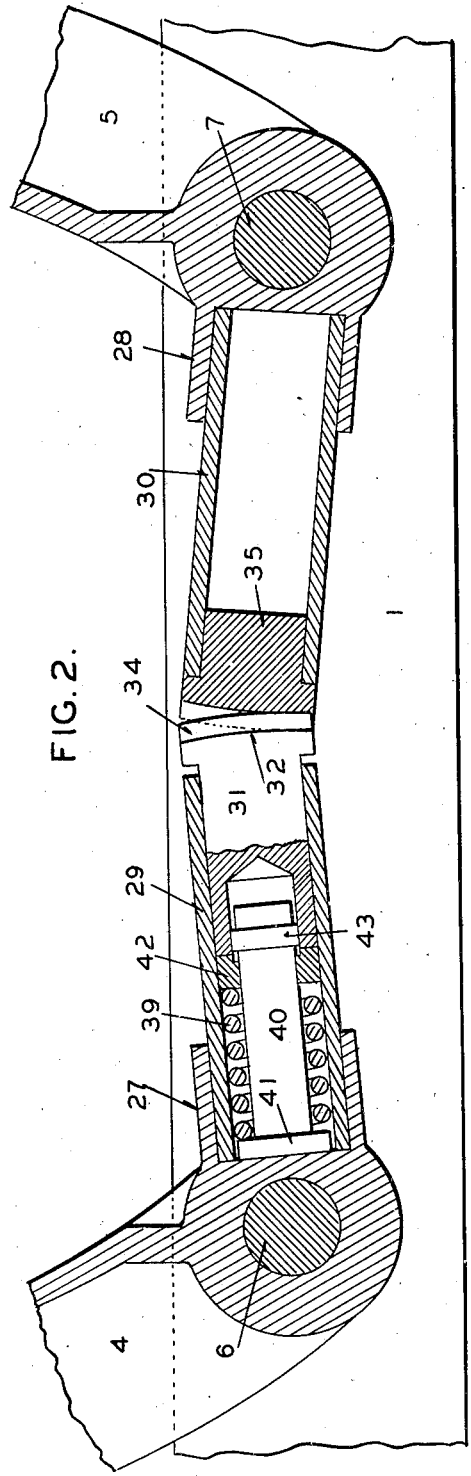
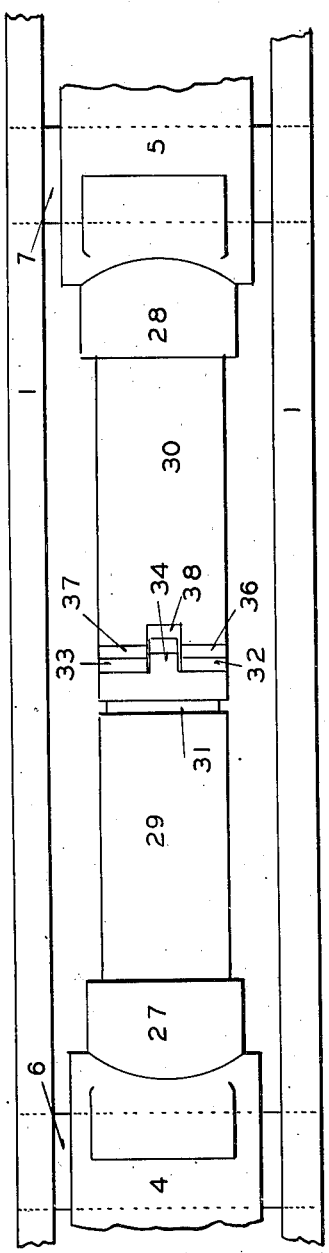
INVENTOR
S. SCHNELL
BY
ATTORNEY Patented July 31, 1945

2,380,796

UNITED STATES PATENT OFFICE 2,380,796

CENTRALIZING DEVICE FOR BRAKE SHOES

Steve Schnell, Kirkwood, Mo., assignor to Wagner Electric Corporation, St. Louis, Mo., a corporation of Delaware Application March 16, 1944, Serial No. 526,674

8 Claims. (Cl. 188—75)

My invention relates to brakes and more particularly to an improved centralizing device for two pivoted brake shoes.

One of the objects of my invention is to provide improved means for centralizing two pivoted brake shoes with respect to their drum when said shoes are in retracted position.

Another object of my invention is to embody in a centralizing means for two brake shoes, means for automatically adjusting the shoes relatively to each other so that the shoe linings will always have equal "off" position clearances notwithstanding the lining of one shoe may wear faster than the other.

Other objects of my invention will become apparent from the following description taken in connection with the accompanying drawings in which Figure 1 is a side view of an industrial brake having a centralizing means associated therewith and embodying my invention; Figure 2 is a sectional view showing details of the centralizing means; and Figure 3 is a top view of the abutting parts of the arms of the centralizing means.

Referring first to Figure 1 in detail, numeral 1 indicates a base supporting member for the brake, said base being mounted beneath a brake drum 2 fixed to a rotating shaft 3 which is to be braked. Pivotally mounted on the supporting base are two levers 4 and 5 extending upwardly on opposite sides of the brake drum to a point above the top side of the brake drum. Pivot pins 6 and 7 are employed to pivot the levers to the base. Lever 4 has pivotally mounted thereon a brake shoe 8 provided with a friction lining 9 and lever 5 has pivotally mounted thereon a similar brake shoe 10 provided with friction lining 11.

The means shown for actuating the brake shoes comprises an L-shaped lever 12 having the outer end of its short leg pivotally mounted to the upper end of lever 4 by means of a pin 13. A link 14 is pivotally connected at one end to the upper end of lever 5 by a pin 15 and the other end of the link is pivotally connected to the heel end of lever 12 by a pin 16 which has an adjusting means 17 associated with it and the link. The outer end of the long arm of lever 12 is adapted to be actuated by a fluid motor which has its cylinder 18 pivotally connected to the lever by a pin 19 and its piston 20 connected by a piston rod 21 and a pivot pin 22 to a bracket 23 carried by the base. A conduit 24 leads from the fluid motor to a suitable source of pressure such as a master cylinder device. There is also provided a retracting spring 25 between levers 12 and 5 carrying brake shoe 10. When the shoes are permitted to be retracted, piston 20 of the fluid motor will abut the inner end of the cylinder and act as a stop.

From the above described structure which is a well-known type of industrial brake, it is seen that when fluid under pressure is applied to the fluid motor, lever 12 will be rotated in the direction of the arrow and the brake shoes applied to the drum to bring about a braking action. When the fluid pressure is released from the fluid motor, the retracting spring 25 will be effective to release the brakes. In this type of brake in which levers such as 4 and 5 are pivotally mounted on the base and the actuating means are supported on the levers, said levers and shoes are free to shift bodily whenever the brake shoes are released from the drum. In other words, no means is provided insuring that both brake shoes will be held away from the drum when in released condition. Generally the brake shoe carrying levers will so shift that one of the brake shoes will lightly drag on the drum and the other shoe will be spaced from the drum. This, of course, is undesirable since it results in wear of the lining of the dragging brake shoe and undesirable braking action.

The centralizing device which is associated with the brake shoes and embodies my invention is employed to prevent shifting of the shoes and so hold the shoes that this shoe dragging will be eliminated. As shown, a tubular extension 27 is provided on lever 4 adjacent its pivot and a tubular extension 28 on lever 5 adjacent its pivot. Held in extension 27 is a tubular arm 29 and held in extension 28 is a tubular arm 30, the inner ends of said tubular arms being closely positioned adjacent each other. The tubular arm 29 carries a slidable plunger 31 in its end adjacent the end of arm 30 and the plunger is provided on its outer end with like arcuate surfaces 32 and 33 positioned on opposite sides of rib 34. Carried in the inner end of arm 30 is a plug 35 which is provided with like arcuate surfaces 36 and 37 on opposite sides of groove 38. The arcuate surfaces 32 and 33 cooperate with arcuate surfaces 36 and 37 and these surfaces are held from lateral relative shifting by rib 34 being received in groove 38. The arcuate surfaces 32 and 33 have their axes coinciding with the axis of the pivot pin 6 of the brake shoe carrying lever 4 and the arcuate surfaces 36 and 37 have their axes coinciding with the axis of pivot pin 7 of the brake shoe carrying lever 5.

The arcuate surfaces are arranged to be in pressure engagement and to accomplish this, plunger 31 is backed by a strong coil spring 39. This spring is in surrounding relation to a pin 40 and has one end abutting against a head 41 on the pin and the other end abutting against a slidable washer 42 which abuts plunger 31. The end of the pin carries a collar 43 which is positioned beyond the washer when the spring is in operative condition and is employed to prevent the washer from sliding off the pin during assembly and disassembly of plunger 31. This will permit the spring to be placed under an initial compression outside the tubular arm. When the spring is compressed by plunger 31, washer 42 will be pushed rearwardly from collar 43 and the spring placed under additional compression and freed to hold the arcuate surfaces in tight frictional engagement.

With the brake having associated with it the centralizing device, as described, it is seen that when the fluid motor is actuated to apply the brakes, the brake shoe carrying levers 4 and 5 will be moved inwardly and the shoes applied to the drum. If the lining of one brake shoe, when released, should have a greater clearance with respect to the drum than the lining of the other brake shoe, there will be a relative sliding movement between the arcuate surfaces. This will permit both brake shoes to be applied with equal pressure and adjustment made. When the brakes are released and the retracting spring 25 acts to move levers 4 and 5 and the shoes away from the drum, both levers will be moved away from the drum an equal distance due to the rolling connection between the arms as provided by the arcuate surfaces which can be said to act as sectors of friction wheels. The brake shoes will now be centralized with respect to the drum. If the lining of one shoe should wear more rapidly than the other, an automatic adjustment will take place between the friction connection provided for the arms, said adjustment being a sliding movement between the arcuate surfaces.

The total "off" position clearance of both shoes will be determined by the adjustment of the adjusting means 17 between the link 14 and arm 12. If the total clearance is desired to be decreased as both linings wear, this can be accomplished by further adjusting of the adjusting means 17. The retracted position of the shoes will always be determined by the piston of the fluid motor abutting the end of the cylinder when the shoes are permitted to be retracted under the action of the retracting spring 25.

If the brakes are being used in connection with a shaft which rotates most of the time in one direction, thereby causing the brake lining on one shoe to wear more than the brake lining of the other shoe, it is possible to compensate for this without any appreciable sliding movement between the arcuate surfaces by merely changing the lengths of arms 29 and 30. If, for example, lining 9 of shoe 8 should wear more rapidly than lining 11 on shoe 10, then arm 29 could be made slightly shorter than arm 30.

Being aware of the possibility of modification in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus, a support, a brake drum, two brake shoes, means for pivotally mounting the shoes on the support, means for actuating the shoes into engagement with the drum, and means extending between and acting on said pivotal mountings for causing the shoes to have simultaneous movement when being moved toward and away from the drum but permitting one shoe to move independently of the other in the event said other shoe contacts the drum prior to said one shoe.

2. In braking apparatus, a support, a brake drum, two brake shoes, means for pivotally mounting the shoes on the support, means for actuating the shoes into engagement with the drum, and means for causing the shoes to have simultaneous movement when being moved toward and away from the drum but permitting one shoe to move independently of the other in the event said other shoe contacts the drum prior to said one shoe, said means comprising members movable with the shoes about their pivots and provided with pressure-engaged arcuate surfaces the axes of which coincide with the shoe pivots.

3. In braking apparatus, a support, a brake drum, two brake shoes, means for pivotally mounting the shoes on the support, means for actuating the shoes into engagement with the drum, a retracting spring, single stop means for limiting the extent of release of both shoes, and means for connecting the shoes together for simultaneous movement toward and away from the drum including friction means having a rolling contact one with the other for permitting one shoe to move independently of the other shoe in the event said other shoe contacts the drum prior to the said one shoe and resilient means urging said friction means into engagement with each other.

4. In braking apparatus, a support, a brake drum, two brake shoes, means for pivotally mounting the shoes on the support, means for actuating the shoes into engagement with the drum, an arm connected to swing with each shoe about its pivot, means connecting the arms to move together, and means having a rolling contact one with the other associated with said connecting means for permitting independent movement of one arm with respect to the other when the shoe with which the arm is associated has not contacted the drum at the time that the other shoe contacts the drum during actuation of the brake shoes, said means including a resilient element to maintain said rolling contact.

5. In braking apparatus, a support, a brake drum, two levers pivoted to the support, brake friction elements carried by the levers, means for moving the levers toward the drum to apply the friction elements, an arm carried by each lever and having cooperating rolling arcuate surfaces on the ends remote from the levers, and means for biasing the surfaces into pressure engagement.

6. In braking apparatus, a support, a brake drum, two levers pivoted to the support, brake friction elements carried by the levers, means for moving the levers toward the drum to apply the friction elements, a member carried by each lever to rotate therewith about its pivot, means providing cooperating arcuate surfaces on the members with each arcuate surface having an axis coinciding with the pivot of its member, and spring means for holding the surfaces in pressure engagement.

7. In braking apparatus, a support, a brake drum, two levers pivoted to the support, brake friction elements carried by the levers, means for moving the levers toward the drum to apply the friction elements, an arm carried by each lever, one of said arms being provided with an arcuate surface, a plunger carried by the other arm and provided with an arcuate surface, and a spring acting on the plunger to bias its arcuate surface into cooperating pressure engagement with the arcuate surface on the first named arm.

8. In braking apparatus, a support, a brake drum, two levers pivoted to the support, brake friction elements carried by the levers, means for moving the levers toward the drum to apply the friction elements, an arm carried by one lever to move therewith about its pivot and provided with an arcuate surface, a tubular arm carried by the other lever to move therewith about its pivot, a plunger mounted in the tubular arm and provided on its outer end with an arcuate surface for engagement with the arcuate surface on the first arm, a headed pin in the tubular arm rearward of the plunger, a coil spring surrounding the pin and interposed between the head of the pin and the plunger to force the arcuate surface of the plunger into pressure engagement with the other arcuate surface, and means carried by the pin for maintaining the spring under compression when the plunger is removed from the tubular arm.

STEVE SCHNELL.